United States Patent [19]

Röder et al.

[11] 4,110,039

[45] Aug. 29, 1978

[54] MICROFILM ENLARGING APPARATUS

[75] Inventors: Edgar Röder; Fritz Merk, both of Wiesbaden; Lüto Röhrig, Naurod, all of Fed. Rep. of Germany

[73] Assignee: Hoechst Aktiengesellschaft, Fed. Rep. of Germany

[21] Appl. No.: 753,629

[22] Filed: Dec. 23, 1976

[30] Foreign Application Priority Data

Dec. 27, 1975 [DE] Fed. Rep. of Germany ... 7541572[U]

[51] Int. Cl.$^2$ .................. G03B 27/74; G03B 27/76
[52] U.S. Cl. .................................. 355/68; 355/71
[58] Field of Search ............. 355/5, 18, 19, 71, 32–38, 355/64, 67, 68, 77

[56] References Cited

U.S. PATENT DOCUMENTS

| 2,701,196 | 2/1955 | Conrad | 355/32 X |
|---|---|---|---|
| 2,794,366 | 6/1957 | Canaday | 355/68 |
| 2,995,978 | 8/1961 | Glandon et al. | 355/68 |
| 3,241,441 | 3/1966 | Barbour et al. | 355/37 X |
| 3,293,033 | 12/1966 | Maddock et al. | 355/38 X |
| 3,469,914 | 9/1969 | Thomson | 355/32 |
| 3,523,728 | 8/1970 | Wick et al. | 355/32 |
| 3,554,642 | 1/1971 | Zahn | 355/38 |
| 3,841,752 | 10/1974 | Terajima et al. | 355/37 X |

FOREIGN PATENT DOCUMENTS 805,891  12/1958  United Kingdom .................... 355/32

Primary Examiner—Donald Griffin
Attorney, Agent, or Firm—James E. Bryan

[57] ABSTRACT

This invention relates to a microfilm-enlarging apparatus comprising means adapted to provide a source of light to expose photosensitive material through a microfilm to be enlarged, sensing means adapted to sense the intensity of the light transmitted, in use of the apparatus, by the entire area of the microfilm to be enlarged substantially only within a wavelength range of from 360 to 560 nm, and control means adapted to control the total amount of light to which the photosensitive material is exposed in an enlargement step in dependence upon the value of the intensity sensed by the sensing means.

10 Claims, 1 Drawing Figure

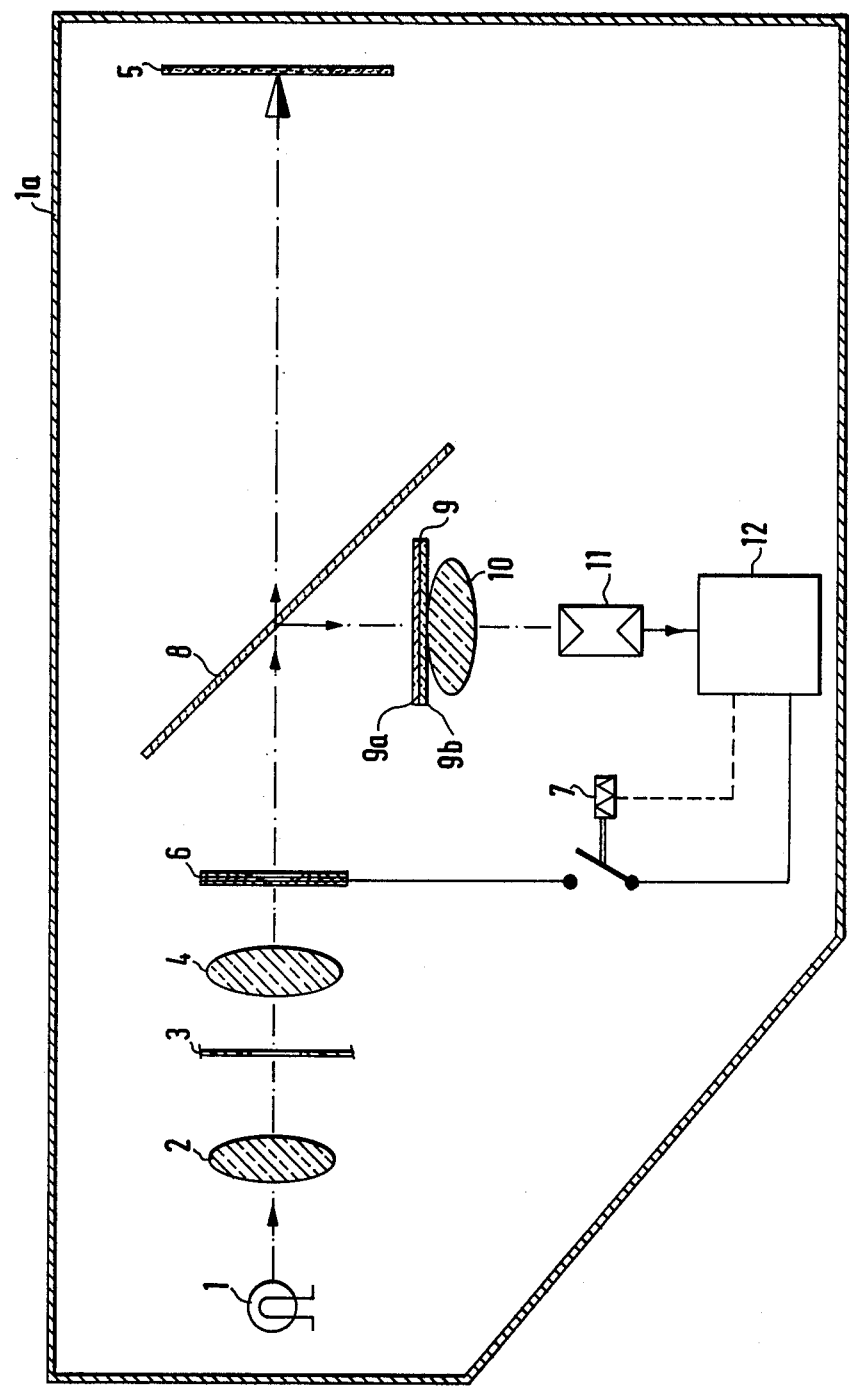

MICROFILM ENLARGING APPARATUS

This invention relates to microfilm enlarging apparatus, especially electrophotographic enlarging apparatus, including means to automatically control the quantity of light used during exposure.

The term "electrophotographic enlarging apparatus" means those apparatuses in which the microfilm is exposed directly onto photoelectrically sensitive material (for example zinc oxide paper) or is transferred indirectly to the copying material by way of photoelectrically sensitive intermediate support.

Microfilm enlarging apparatuses are known in which the quantity of light for the exposure of the photosensitive material can be manually controlled. Microfilm re-enlarging apparatuses having a brightness control and such apparatuses in which there is a light source of constant intensity, the duration of exposure being variable, already have been proposed. By means of manual adjustment of the brightness or of the elements controlling the duration of exposure, the quantity of light required can be varied depending, in particular, upon the optical density of the microfilm which is to be enlarged and on the sensitivity to light of the photosensitive material. Optimum results are achieved, however, only when the operator knows what quantity of light is to be provided for the parameters observed, i.e. optical density of the microfilm, contrast, line width and sensitivity of the photosensitive material, and adjusts the microfilm re-enlarging apparatus accordingly.

In order to take these parameters into account, it has been proposed, for microfilm enlarging apparatuses provided with automatic card entry, to pre-sort the cards manually into at least two exposure classes.

Apart from the application for microfilm enlarging apparatuses, processes and apparatuses have been proposed which automatically control the quantity of light with which photosensitive material is exposed through a transparent original. In photoprinting machines, the transparency of the original is measured and the run-through speed of the original and of the copying material in an exposure station is controlled according to the transparency of the original. An improvement in the photoprints produced is achieved by using measuring element, which measures the transparency of the original as a function of the light wavelength, having a sensitivity corresponding to the spectral sensitivity of the copying material. In order to fulfill this requirement, a filter arrangement is provided in the optical light ray path to the measuring element. In particular, the filter may have several part filters arranged adjacent one another, each having a different spectral transmission, an independently adjustable intensity matching stage being provided for each measuring light beam passing through a part filter. (See German Offenlegungsschrift No. 2,119,871).

In cases where several copying materials of differing sensitivity are provided in a photoprinting machine, it has been proposed to achieve a further improvement by providing at least two amplifier units an appropriate one of which can be switched into the control signal circuit as required, and by associating each type of copying material with a pre-select switch which can be switched into the exposure control signal circuit to pre-select one of the amplifier units according to the type of copying material (see German Offenlegungsschrift No. 2,209,725). Specifically, each type of copying material has associated therewith a scanning device in the path of the original, which scanning device, when it is actuated by the original, switches the preselected amplifier unit into the control signal circuit. After a roll of copying material has been inserted into the copying apparatus, one of the amplifier units is selected by the pre-select switch, according to the sensitivity of the copying material. When an original enters the apparatus and the scanning device has determined the format of the original and — accordingly — which copying material is provided, the filter and amplifier unit, which is set to the sensitivity of the copying material, is switched into the control circuit.

In the case of enlargements produced with microfilm enlarging apparatus it has been found that the enlargements are not always of optimum quality even when the duration of exposure is correctly set as a function of the sensitivity of the photosensitive material in accordance with knowledge acquired from photoprinting processes. Other factors being equal, the quality varies among different types of microfilm. As an example of different types, silver film originals and diazo copies thereof may be considered. In the case of enlargement of such different types, differing results may occur even when the different types represent the same original and are produced under the best possible conditions in order to achieve, insofar as possible, matching image contrast.

Furthermore, when measuring the light transmission of microfilms, the problem may a rise that the microfilms have a different ratio of image areas of non-image areas. When measuring the mean density over the total surface of the microfilm being copied, there is the risk that there is not a uniform density, i.e. the measured mean density varies to such a degree as a function of the ratio of image areas to non-image areas that unacceptable differences in the quality of the enlarged images may occur.

In connection with the automatic production of prints in color photography, it is known to measure not only the mean density over the total area of the original, apart from the densities of blue, green and red (see German Offenlegungsschrift No. 2,326,538), but to use a density measuring section which measures the density of a number of extracts of the original being copied in order to determine the maximum transmission density, the minimum transmission density and the transmission density of the center, top and bottom, and left and right-hand areas, as well as the total area transmission density of the original. In order to achieve this, in a negative measuring station for the determination of the characteristics of the negative color film being printed, integration curves determining three color components are provided and are exposed to an attenuated portion of the light flux issuing from the negative film image, by way of semi-transparent mirrors. Part of the total light flux is also reflected by means of one of the semi-transparent mirrors onto a measuring section for the negative density distribution. This is composed of a multiplicity of lens-like sections which are led by way of photoconductors to photomultipliers. A filter is arranged between the measuring section and the semi-transparent mirror. In addition, the apparatus for automatic production of prints in color photography has a station for the determination of the type of film being printed. The degree of exposure of the print is determined not only according to the measurement of the total area transmission density and the density in the different areas of the negative film image, as well as the maximum and minimum density, but also by further parameters, especially the type of film.

When this apparatus functions perfectly, very high quality color prints can be produced therewith. The expenditure required is very high, however, even if the elements of the apparatus for measuring and processing of the color densities were to be omitted. Because of the high cost, this apparatus is not, in practice, used for microfilm enlarging.

In the case of electrophotographic microfilm enlarging apparatus, a process has been proposed for automatic control of the quantity of light with which photosensitive material is exposed through a transparent microfilm. In that process, the transmission of the microfilm over a spectrum of the actinic light range corresponding to the spectral sensitivity of the photosensitive material is measured. In order to automatically determine the type of material of the microfilm its transmission in at least one additional spectrum range having transmissions which are characteristics for the types of materials which are to be differentiated is measured and classified in each case into one of at least two transmission ranges which are typical for each type of material. For each type of material a function of the quantity of light necessary for the exposure is provided by a function generator in each case from the transmission of the microfilm in the actinic range and the selection of the function generator is effected in accordance with classified transmission (see German patent application No. 2,518,787).

There has been proposed an arrangement for the execution of this process in a microfilm enlarging apparatus comprising a setting device to control the quantity of light with which a light source exposes the photosensitive material through the transparent microfilm and at least one measuring apparatus is provided which measures the transmission of the microfilm in a first actinic range and which has a spectral sensitivity corresponding to that of the photosensitive material. For each microfilm material type to be differentiated, a function generator is provided which has a transfer response corresponding to a function, prescribed for a particular material type, of the quantity of light from the transmission of the microfilm in the actinic range. In any given case, an appropriate one of the function generators can be switched into a control circuit between the measuring element and the setting device by means of a switching device. At least one additional measuring element which measures the transmission of the microfilm is connected to a discriminator which classifies the signals from the additional measuring element or elements into one of at least two signal ranges typical for one material type in each case and the output of the discriminator is connected to an actuating element of the switching device.

By using the control process and apparatus just described, good enlargements can be automatically obtained, irrespective of the type of microfilm original, at a comparatively low cost, but even this cost is considerably higher compared with microfilm enlarging apparatuses having only manual adjustment of the exposure.

The purpose of the present invention is to provide a microfilm re-enlarging apparatus having a relatively simple and inexpensive arrangement for automatic exposure control by means of which at least satisfactory enlargements of different types of microfilm can be produced.

According to the present invention, there is provided a microfilm-enlarging apparatus comprising means to provide a source of light to expose photosensitive material through the microfilm to be enlarged, sensing means to sense the intensity of the light transmitted, in use of the apparatus, by the entire area of the microfilm to be enlarged substantially only within a wavelength range of from 360 to 560 nm, and control means to control the total amount of light to which the photosensitive material is exposed in an enlargement step in dependence upon the value of the intensity sensed by the sensing means.

It has been found that enlargements of at least satisfactory quality can be produced from different types of microfilm, especially silver film and diazo film, if the total area density of the microfilm image being enlarged is measured by way of a filter which transmits only in the spectral range between 360 – 560 nm. A single function generator, by means of which the light intensity measuring element, e.g. a photoelectric cell, exposed to the filtered light, is connected to exposure control means, and is used for all the microfilm types. The function generator determines for different mean total transmission values the quantity of light to be provided during enlargement. This function preferably has been obtained as a mean value of the maximum and minimum measured quantity of light that can be used, starting from the different microfilm types, and is preferably approximated by means of a linear algebraic equation.

It has been found that, in addition, at least satisfactory enlargements can be exposed automatically even if the different microfilm images have a different ratio of image areas to non-image areas. As in correction methods known from the production of half-tone images, especially in color photography, the alterations in the average density arising from the different ratio of image areas of non-image areas would have to be compensated for. In the present application, however, i.e. to microfilming, it is a question of exposing exclusively covered and uncovered image or non-image areas, dispensing with half-tones, and this is possible with the apparatus according to the invention. The expenditure necessary for this purpose is low.

By means of a semi-transparent beam-splitter arranged in the path of rays between the microfilm and the photosensitive material, a fraction of the total light flux transmitted by the microfilm is reflected through the filter onto, for example, the photoelectric measuring element. The magnitude of the electrical signal emitted by the measuring element, which magnitude corresponds to the average optical density of the microfilm is converted by the function generator into, for example, a signal which governs the duration of exposure. In this case a voltage-time converter would be used as the function generator. After the exposure time has elapsed, exposure is stopped by, for example, closing a shutter arranged in the path of rays between the light source.

Instead of this, however, there may be used, for example a constant exposure time with variable shutter opening. In this case, the function generator can be so constructed that, in conjunction with, for example, an electro-mechanically actuated diaphragm, it alters the light flux issuing from the microfilm onto the photosensitive material. In this case, the function generator may also or alternatively alter the voltage, and therefore the intensity, of the light source.

An apparatus constructed according to the invention will now be illustrated in greater detail, by way of example only, with reference to the accompanying drawing, which is a diagrammatic representation, partly in section, of the apparatus.

Referring to the drawing, the apparatus comprises a housing 1a and a projection lamp 1 which illuminates a microfilm aperture card 3 through a condenser 2. The extract of the film aperture card to be enlarged is projected, on an enlarged scale, onto the photosensitive material 5 by means of an objective lens 4. The photosensitive material 5 preferably is zinc oxide paper on which a latent electrostatic image, which can be developed with electrically charged dyestuff particles, is produced by means of electrostatic charging and subsequent imagewise exposure.

In the light path between the photosensitive material 5 and the film aperture card 3, (in the present embodiment between the photosensitive material 5 and the objective 4) there is a shutter 6 which can be opened and closed by means of an electromagnetic actuating element 7.

In the light path between the shutter 6 and the photosensitive material 5 there is a beam splitter 8 which is in the form of a flat-ground glass plate. The entirety of the light flux issuing from the film aperture card 3 is incident upon the beam splitter 8. Part of the total light flux leaves the beam splitter 8 uniformly attenuated in the direction of the photosensitive material 5. Another, smaller, part of the total light flux is reflected out of the main optical axis according to the inclination of the beam splitter 8. The reflected portion of the light passes through a filter combination 9, composed of two filters 9a and 9b arranged one behind the other. The filter combination 9 transmits light substantially only in the spectral range between 360 and 560 nanometers (nm). It is of particular advantage of select for this purpose the filter BG 38 of Messrs. Schott of Mainz for the filter 9a and the filter type GG 420 by the same firm for the filter 9b.

The filter combination 9 is arranged between the beam splitter 8 and a lens 10 which concentrates the light beam passing through the filter combination 9 onto a photoelectric measuring element 11. The photoelectric measuring element 11 is connected to a function generator 12. The function generator 12 is so constructed that, during a period of time correlated according to a linear algebraic equation to the light flux passing through the measuring element 11, it emits an output voltage to the electromagnetic actuating element 7. This period of time is the exposure time required for enlargement. The function generator 12, which thus represents a voltage-time converter, may be constructed in accordance with the disclosure of German Offenlegungsschrift No. 1,572,236.

The function produced by the function generator 12 between the light flux (and/or the voltage emitted by the measuring element 11) and the period of time during which the actuating element 7 is supplied with current is prescribed for the various microfilm types that may be enlarged when the function generator 12 is being calibrated.

When the arrangement is in operation, the projection lamp 1 is switched on. At the same time, upon actuation of a switch (not shown), the shutter 6 is opened by means of the electromagnetic actuating element 7, and the exposure of the photosensitive material 5 begins. Part of the light flux is deflected by the beam splitter 8 through the filter combination 9 onto the photoelectric measuring element 11. The photoelectric measuring element 11 therefore receives a portion of the light flux in the spectral range between 360 and 560 nm. The light flux in this spectral range represents a good measurement criterion for the total quantity of light required for exposure, independently of the type of microfilm used. Depending upon the light flux impinging on the photoelectric element 11, the function generator 12 causes the actuating element 7 to be supplied with current for a longer or shorter period. The shutter 6 is thus opened for as long as is desirable for the exposure of the photosensitive material 5. After this period has elapsed, the shutter 6 is automatically closed and exposure of the photosensitive material 5 is interrupted. The apparatus is then ready to perform another enlargement.

It will be obvious to those skilled in the art that many modifications may be made within the scope of the present invention without departing from the spirit thereof, and the invention includes all such modifications.

What is claimed is:

1. Electrophotographic microfilm-enlarging apparatus comprising means adapted to provide a source of light to expose photosensitive material through a microfilm to be enlarged, sensing means adapted to sense the intensity of the light transmitted, in use of the apparatus, by the entire area of the microfilm to be enlarged, substantially only within a wavelength range of from 360 to 560 nm, a filter in the light path to the sensing means, said filter being capable of transmitting substantially only light having a wavelength of from 360 to 560 nm, and control means adapted to control the total amount of light to which the photosensitive material is exposed in an enlargement step in dependence upon the value of the intensity sensed by the sensing means.

2. Apparatus as claimed in claim 1 comprising a part light-transmissive, part light-reflective element means arranged to transmit some of the light emerging from the microfilm, in use of the apparatus, onto the photosensitive material and to reflect the rest of the light emerging from the microfilm onto the sensing means.

3. Apparatus as claimed in claim 2 wherein said element means is a flat-ground glass plate.

4. Apparatus as claimed in claim 1 in which the filter is a combination of at least two filters.

5. Apparatus as claimed in claim 1 in which the sensing means comprises a photoelectric cell.

6. Apparatus as claimed in claim 5 wherein the photoelectric cell is a large-area selenium or a large-area germanium sulfide cell.

7. Apparatus as claimed in claim 1 including shutter means actuable directly or indirectly by the control means to allow exposure of the photosensitive material for a period of time determined by the control means in accordance with the light intensity sensed by the sensing means.

8. Apparatus as claimed in claim 1 including means to adjust the intensity of the light source, via the control means, in accordance with the light intensity sensed by the sensing means.

9. Apparatus as claimed in claim 1 including a function generator means adapted to produce a control signal that varies substantially linearly with the light intensity sensed by the sensing means.

10. A method of enlarging a microfilm using an apparatus as claimed in claim 1.

* * * * *